United States Patent [19]
Gundlach et al.

[11] Patent Number: 5,766,325
[45] Date of Patent: Jun. 16, 1998

[54] INK COMPOSITIONS FOR THERMAL INK JET PRINTING

[75] Inventors: Kurt B. Gundlach; Luis A. Sanchez; Danielle Avolio, all of Fairport; Maura A. Sweeney; Richard L. Colt, both of Rochester, all of N.Y.

[73] Assignee: Xerox Corporation, Stamford, Conn.

[21] Appl. No.: 961,334

[22] Filed: Oct. 30, 1997

[51] Int. Cl.⁶ .................................................. C07D 11/02
[52] U.S. Cl. .................................. 106/31.43; 106/31.47; 106/31.58; 106/31.75; 106/31.77; 106/31.86
[58] Field of Search ........................... 106/31.43, 31.47, 106/31.58, 31.75, 31.77, 31.86

[56] References Cited

U.S. PATENT DOCUMENTS

| | | | |
|---|---|---|---|
| 3,948,668 | 4/1976 | Hayek et al. | 106/31.59 |
| 4,880,565 | 11/1989 | Rose et al. | 106/31.43 |
| 5,019,166 | 5/1991 | Schwarz | 106/22 |
| 5,156,675 | 10/1992 | Breton et al. | 106/31.58 |
| 5,389,133 | 2/1995 | Gundlach et al. | 106/22 H |
| 5,401,303 | 3/1995 | Stoffel et al. | 106/20 R |
| 5,531,815 | 7/1996 | Gundlach et al. | 106/20 R |
| 5,540,765 | 7/1996 | Gundlach et al. | 106/20 R |
| 5,560,766 | 10/1996 | Gundlach | 106/31.27 |
| 5,560,770 | 10/1996 | Yatake | 106/31.58 |
| 5,690,722 | 11/1997 | Pawlowski | 106/31.86 |

*Primary Examiner*—Helene Klemanski
*Attorney, Agent, or Firm*—Judith L. Byorick

[57] ABSTRACT

Disclosed is an ink composition which comprises (1) water, (2) a colorant, (3) a material of the formula $[(F_3C(F_2C)_n CH=CHCH_2OCH(OH)CH_2)_2NCH_2COO^-][X^+]$, wherein X is a cation and n is an integer of from about 3 to about 20, (4) a polymer selected from the group consisting of (a) tetrafunctional block copolymers derived from the addition of propylene oxide and ethylene oxide to ethylenediamine; (b) polyethylene oxide-polypropylene oxide-polyethylene oxide triblock copolymers; (c) polypropylene oxide-polyethylene oxide-polypropylene oxide triblock copolymers; (d) ethoxylated 2-naphthol polymers; and (e) mixtures thereof; and (5) an additive selected from the group consisting of (i) diethylene glycol; (ii) glycerol; (iii) trimethylol propane; (iv) urea; (v) n-methyl pyrrolidone; (vi) sulfolane; (vii) 1,4 diazabicyclo(2.2.2)octane; (viii) cyclohexylpyrrolidone; and (ix) mixtures thereof. Also disclosed are ink jet printing processes employing the aforementioned ink.

21 Claims, No Drawings

5,766,325

INK COMPOSITIONS FOR THERMAL INK JET PRINTING

BACKGROUND OF THE INVENTION

The present invention is directed to ink compositions and to processes for the preparation and use thereof. More specifically, the present invention is directed to compositions suitable for use in ink jet printing processes. One embodiment of the present invention is directed to an ink composition which comprises (1) water, (2) a colorant, (3) a material of the formula $[(F_3C(F_2C)_nCH=CHCH_2OCH(OH)CH_2)_2NCH_2COO^-][X^+]$, wherein X is a cation and n is an integer of from about 3 to about 20, (4) a polymer selected from the group consisting of (a) tetrafunctional block copolymers derived from the addition of propylene oxide and ethylene oxide to ethylenediamine; (b) polyethylene oxide-polypropylene oxide-polyethylene oxide triblock copolymers; (c) polypropylene oxide-polyethylene oxide-polypropylene oxide triblock copolymers; (d) ethoxylated 2-naphthol polymers; and (e) mixtures thereof; and (5) an additive selected from the group consisting of (i) diethylene glycol; (ii) glycerol; (iii) trimethylol propane; (iv) urea; (v) n-methyl pyrrolidone; (vi) sulfolane; (vii) 1,4diazabicyclo(2.2.2)octane; (viii) cyclohexylpyrrolidone; and (ix) mixtures thereof.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

U.S. Pat. No. 5,019,166 (Schwarz), the disclosure of which is totally incorporated herein by reference, discloses a thermal ink jet printing composition comprising a dye, a liquid medium, and a surfactant selected from the group consisting of polyoxyalkylated ethers, anionic bitail fluorothio alkyls, alkyl aryl sulfonates, alkyl amine quaternary salts, and mixtures thereof. Also disclosed is a process for generating images which comprises causing the ink compositions disclosed herein to be ejected from a thermal ink jet printer in imagewise fashion onto a substrate.

U.S. Pat. No. 5,401,303 (Stoffel et al.), the disclosure of which is totally incorporated herein by reference, discloses a process wherein the halo effect seen at the interface between a first ink, exhibiting sharp edge acuity, and a second ink, having low surface energy, is addressed by adding certain fluorocarbon compounds to the first ink. Edge acuity of the first ink is maintained.

U.S. Pat. No. 5,540,765 (Gundlach et al.), the disclosure of which is totally incorporated herein by reference, discloses a thermal ink jet printing composition which contains a surfactant comprising an alkylsulfoxide having an alkyl group of 4 to 6 carbon atoms. Preferably, the composition contains a betaine zwitterionic base and dibutylsulfoxide.

U.S. Pat. No. 5,531,815 (Gundlach et al.), the disclosure of which is totally incorporated herein by reference, discloses a thermal ink jet printing composition contains a betaine zwitterionic base and a quasisurfactant penetrant.

U.S. Pat. No. 5,389,133 (Gundlach et al.), the disclosure of which is totally incorporated herein by reference, discloses a process for preparing an aqueous ink composition which comprises adjusting the pH of the ink with phosphorous acid or phosphite salts. Also disclosed are ink compositions prepared by this process. In certain preferred embodiments, the ink compositions can also contain betaine, sulfolane, dimethyl sulfoxide, or N,N'-bis(3-aminopropyl)-1,2-ethylenediamine, as well as mixtures thereof. In other preferred embodiments, the ink composition comprises an organic component selected from the group consisting of sulfolane, dimethyl sulfoxide, and mixtures thereof, and anions selected from the group consisting of phosphite, hypophosphite, phosphate, polyphosphate, sulfate, hexafluorophosphate, glycolate, acetate, ethylenediaminetetraacetate, formate, borate, sulfite, sulfamate, and mixtures thereof.

Copending application U.S. Ser. No. 08/961,335, filed concurrently herewith, entitled "Improved Ink Compositions for Thermal Ink Jet Printing," with the named inventors Kurt B. Gundlach, Richard L. Colt, and Edward J. Radigan, Jr., the disclosure of which is totally incorporated herein by reference, discloses an ink composition which comprises water, a colorant, betaine, a tertiary amine, and a material of the formula $[(F_{2n+1}C_nCH_2S)_2(CH_3)C-CH_2CH_2COO^-][B^+]$, wherein n is an integer of from about 8 to about 20 and B is a cation. In one specific embodiment, n is 10 and B is $(HO-CH_2CH_2)_2NH_3^+$. In another specific embodiment, the tertiary amine is 1-methylimidazole. In yet another specific embodiment of the present invention, the colorant is an anionic dye with carboxylate groups, sulfonate groups, or both carboxylate and sulfonate groups. Also disclosed is a process for preparing the aforementioned ink composition wherein a liquid containing the material of the formula $[(F_{2n+1}C_nCH_2S)_2(CH_3)C-CH_2CH_2COO^-][B^+]$ is subjected to centrifugation. Also disclosed are ink jet printing processes employing the aforementioned ink.

Copending application U.S. Ser. No. 08/961,435, filed concurrently herewith, entitled "Improved Ink Compositions for Thermal Ink Jet Printing," with the named inventors Kurt B. Gundlach, Luis A. Sanchez, Cheryl A. Hanzlik, Kathy-Jo Brodsky, Richard L. Colt, Aileen M. Montes, and Edward J. Radigan, Jr., the disclosure of which is totally incorporated herein by reference, discloses an ink composition which comprises (a) water, (b) a colorant, (c) a fluorinated material selected from: (1) those of the formula $[(F_{2n+1}C_nCH_2S)_2(CH_3)C-CH_2CH_2COO^-][B^+]$, wherein n is an integer of from about 8 to about 20 and B is a cation, (2) those of the formula $[(F_3C(F_2C)_nCH=CHCH_2OCH(OH)CH_2)_2NCH_2COO^-][X^+]$, wherein is a cation and n is an integer of from about 3 to about 20, and (3) mixtures thereof, and (d) a monomeric compound having at least two carboxylic acid functional groups. Also disclosed is a process for preparing said ink composition which comprises (i) admixing the ink ingredients, and (ii) subjecting the mixture thus formed to ultrasonification, thereby reducing the average particle diameter of liposomes of the fluorinated material in the ink. Further disclosed is a process which entails (i) incorporating into an ink jet printing apparatus the aforementioned ink composition, and (ii) causing droplets of the ink composition to be ejected in an imagewise pattern onto a substrate. In a preferred embodiment, the printing apparatus employs a thermal ink jet process wherein the ink in the nozzles is selectively heated in an imagewise pattern, thereby causing droplets of the ink to be ejected in imagewise pattern.

Copending application U.S. Ser. No. 08/961,118, filed concurrently herewith, entitled "Improved Ink Compositions for Thermal Ink Jet Printing," with the named inventors Kurt B. Gundlach, Luis A. Sanchez, Cheryl A. Hanzlik, Kathy-Jo Brodsky, Richard L. Colt, Aileen M. Montes, Danielle Avolio, and Rachael L. McGrath, the disclosure of which is totally incorporated herein by reference, discloses an ink composition which comprises (a) water, (b) a colorant, and (c) a material of the formula $[(F_3C(F_2C)_nCH=CHCH_2OCH(OH)CH_2)_2NCH_2COO^-][X^+]$, wherein X is a cation and n is an integer of from about 3 to about 20. Also disclosed are processes for preparing the ink composition and ink jet printing processes with the ink composition.

Copending application U.S. Ser. No. 08/961,461, filed concurrently herewith, entitled "Improved Ink Compositions for Thermal Ink Jet Printing," with the named inventors Kurt B. Gundlach and Walter F. Wafler, the disclosure of which is totally incorporated herein by reference, discloses an ink composition which comprises water, a colorant, a nonionic surfactant, and a fluorinated material selected from the group consisting of (a) those of the formula $[(F_{2n+1}C_nCH_2S)_2(CH_3)C-CH_2CH_2COO^-][B^+]$, wherein n is an integer of from about 8 to about 20 and B is a cation, and (b) those of the formula $[(F_3C(F_2C)_nCH=CHCH_2OCH(OH)CH_2)_2NCH_2COO^{-1}][X^+]$, wherein X is a cation. Also disclosed are ink jet printing processes employing the aforementioned ink.

Copending application U.S. Ser. No. 08/961,637, filed concurrently herewith, entitled "Improved Ink Compositions for Thermal Ink Jet Printing," with the named inventors Kurt B. Gundlach, Luis A. Sanchez, Cheryl A. Hanzlik, Kathy-Jo Brodsky, Richard L. Colt, and Aileen M. Montes, the disclosure of which is totally incorporated herein by reference, discloses an ink composition which comprises water, an anionic dye having at least one anionic functional group and having a cationic counterion associated with each anionic functional group, and a material of the formula $[(F_{2n+1}C_nCH_2S)_2(CH_3)C-CH_2CH_2COO^-][B^+]$, wherein n is an integer of from about 8 to about 20 and B is a cation, said ink composition containing alkali metal cations in an amount of no more than about $1 \times 10^{-3}$ moles per liter. Also disclosed are ink jet printing processes employing the aforementioned ink.

Copending application U.S. Ser. No. 08/961,173, filed concurrently herewith, entitled "Improved Ink Compositions for Thermal Ink Jet Printing," with the named inventors Kurt B. Gundlach, Luis A. Sanchez, Richard L. Colt, and Rachael L. McGrath, the disclosure of which is totally incorporated herein by reference, discloses an ink composition which comprises water, a colorant, a bisquaternary ammonium compound, and a material of the formula $[(F_3C(F_2C)_nCH=CHCH_2OCH(OH)CH_2)_2NCH_2COO^-][X^+]$, wherein X is a cation and n is an integer of from about 3 to about 20. Also disclosed are ink jet printing processes employing the aforementioned ink.

Copending application U.S. Ser. No. 08/961,393, filed concurrently herewith, entitled "Improved Ink Compositions for Thermal Ink Jet Printing," with the named inventors Kurt B. Gundlach, Richard L. Colt, Luis A. Sanchez, and Danielle Avolio, the disclosure of which is totally incorporated herein by reference, discloses an ink composition which comprises water, a colorant, 1,4-diazabicyclo(2.2.2)octane, and a fluorinated material selected from the group consisting of (a) those of the formula $[(F_{2n+1}C_nCH_2S)_2(CH_3)C-CH_2CH_2COO^-][B^+]$, wherein n is an integer of from about 8 to about 20 and B is a cation, and (b) those of the formula $[(F_3C(F_2C)_nCH=CHCH_2OCH(OH)CH_2)_2NCH_2COO^-][X^+]$, wherein X is a cation and n is an integer of from about 3 to about 20. Also disclosed are processes for preparing the aforementioned ink and ink jet printing processes employing the aforementioned ink.

Copending application U.S. Ser. No. 08/960,991, filed concurrently herewith, entitled "Improved Ink Compositions for Thermal Ink Jet Printing," with the named inventors Kurt B. Gundlach, Luis A. Sanchez, and Richard L. Colt, the disclosure of which is totally incorporated herein by reference, discloses an ink composition which comprises water, a dye selected from the group consisting of Direct Blue 199, Direct Yellow 132, Acid Yellow 17, Reactive Red 180, Acid Red 52, and mixtures thereof, and a material of the formula $[(F_3C(F_2C)_nCH=CHCH_2OCH(OH)CH_2)_2NCH_2COO^-][X^+]$, wherein X is a cation and n is an integer of from about 3 to about 20, wherein the ink is substantially free of imidazole. Also disclosed are ink jet printing processes employing the aforementioned ink.

Copending application U.S. Ser. No. 08/960,792, filed concurrently herewith, entitled "Improved Ink Compositions for Thermal Ink Jet Printing," with the named inventors Kurt B. Gundlach, Luis A. Sanchez, Richard L. Colt, and Danielle Avolio, the disclosure of which is totally incorporated herein by reference, discloses an ink composition which comprises (a) water, (b) a colorant selected from the group consisting of Acid Yellow 23, Acid Yellow 17, Reactive Red 180, Direct Blue 199, Acid Blue 9, and mixtures thereof, (c) imidazole, (d) an additive selected from the group consisting of betaine, polyethylene oxide, and mixtures thereof, and (e) a material of the formula $[(F_3C(F_2C)_nCH=CHCH_2OCH(OH)CH_2)_2NCH_2COO^-][X^+]$, wherein X is a cation and n is an integer of from about 3 to about 20. Also disclosed are ink jet printing processes employing the aforementioned ink.

While known compositions and processes are suitable for their intended purposes, a need remains for ink compositions with improved characteristics. In addition, a need remains for ink compositions which exhibit reduced or no intercolor bleed when printed adjacent to other inks of different colors. Further, a need remains for ink compositions having good latency characteristics. Additionally, a need remains for ink compositions with good shelf stability. There is a also need for ink compositions which are compatible with sponge delivery in thermal ink jet printing hardware. A need further remains for ink compositions which do not interact or react adversely with the materials commonly used to fabricate thermal ink jet printheads. There is also a need for ink compositions which enable the generation of prints having high solid area density. In addition, there is a need for ink compositions which exhibit reduced showthrough when printed on paper substrates. Further, there is a need for ink compositions which enable the generation of prints on various papers with reduced or eliminated curling of the paper. Additionally, there is a need for ink compositions suitable for printing onto a wide variety of substrates. A need also remains for ink compositions exhibiting good freeze/thaw stability. In addition, a need remains for ink compositions exhibiting high stability over time after having been heated. Further, a need remains for ink compositions with improved color gamut. Additionally, a need remains for ink compositions having dye colorants which exhibit reduced intercolor bleed with ink compositions having pigment colorants, whether or not the pigmented ink compositions contain a fluorinated material.

SUMMARY OF THE INVENTION

It is an object of the present invention to provide ink compositions with the above noted advantages.

It is another object of the present invention to provide ink compositions with improved characteristics.

It is yet another object of the present invention to provide ink compositions which exhibit reduced or no intercolor bleed when printed adjacent to other inks of different colors.

It is still another object of the present invention to provide ink compositions having good latency characteristics.

Another object of the present invention is to provide ink compositions with good shelf stability.

Yet another object of the present invention is to provide ink compositions which are compatible with sponge delivery in thermal ink jet printing hardware.

Still another object of the present invention is to provide ink compositions which do not interact or react adversely with the materials commonly used to fabricate thermal ink jet printheads.

It is another object of the present invention to provide ink compositions which enable the generation of prints having high solid area density.

It is yet another object of the present invention to provide ink compositions which exhibit reduced showthrough when printed on paper substrates.

It is still another object of the present invention to provide ink compositions which enable the generation of prints on various papers with reduced or eliminated curling of the paper.

Another object of the present invention is to provide ink compositions suitable for printing onto a wide variety of substrates.

Yet another object of the present invention is to provide ink compositions exhibiting good freeze/thaw stability.

Still another object of the present invention is to provide ink compositions exhibiting high stability over time after having been heated.

It is another object of the present invention to provide ink compositions with improved color gamut.

It is yet another object of the present invention to provide ink compositions having dye colorants which exhibit reduced intercolor bleed with ink compositions having pigment colorants, whether or not the pigmented ink compositions contain a fluorinated material.

These and other objects of the present invention (or specific embodiments thereof) can be achieved by providing an ink composition which comprises (1) water, (2) a colorant, (3) a material of the formula $[(F_3C(F_2C)_nCH=CHCH_2OCH(OH)CH_2)_2NCH_2COO^-][X^+]$, wherein X is a cation and n is an integer of from about 3 to about 20, (4) a polymer selected from the group consisting of (a) tetrafunctional block copolymers derived from the addition of propylene oxide and ethylene oxide to ethylenediamine; (b) polyethylene oxide-polypropylene oxide-polyethylene oxide triblock copolymers; (c) polypropylene oxide-polyethylene oxide-polypropylene oxide triblock copolymers; (d) ethoxylated 2-naphthol polymers; and (e) mixtures thereof; and (5) an additive selected from the group consisting of (i) diethylene glycol; (ii) glycerol; (iii) trimethylol propane; (iv) urea; (v) n-methyl pyrrolidone; (vi) sulfolane; (vii) 1,4diazabicyclo(2.2.2)octane; (viii) cyclohexylpyrrolidone; and (ix) mixtures thereof.

DETAILED DESCRIPTION OF THE INVENTION

Inks of the present invention contain an aqueous liquid vehicle, a colorant, a material of the formula $[(F_3C(F_2C)_n$ CH=CHCH$_2$OCH(OH)CH$_2$)$_2$NCH$_2$COO$^+$][X$^+$], wherein X is a cation and n is an integer of from about 3 to about 20, a polymer selected from the group consisting of (a) tetrafunctional block copolymers derived from the addition of propylene oxide and ethylene oxide to ethylenediamine; (b) polyethylene oxide-polypropylene oxide-polyethylene oxide triblock copolymers; (c) polypropylene oxide-polyethylene oxide-polypropylene oxide triblock copolymers; (d) ethoxylated 2-naphthol polymers; and (e) mixtures thereof, and an additive selected from the group consisting of (i) diethylene glycol; (ii) glycerol; (iii) trimethylol propane; (iv) urea; (v) n-methyl pyrrolidone; (vi) sulfolane; (vii) 1,4diazabicyclo(2.2.2)octane; (viii) cyclohexylpyrrolidone; and (ix) mixtures thereof. The liquid vehicle can consist solely of water, or it can comprise a mixture of water and a water soluble or water miscible organic component, such as ethylene glycol, propylene glycol, dipropylene glycols, polyethylene glycols, polypropylene glycols, tripropylene glycol monomethyl ether, amides, ethers, substituted ureas, ethers, carboxylic acids and their salts, esters, alcohols, organosulfides, organosulfoxides, sulfones, alcohol derivatives, carbitol, butyl carbitol, cellusolve, ether derivatives, amino alcohols, ketones, 2-pyrrolidinone, hydroxyethers, amides, sulfoxides, lactones, polyelectrolytes, methyl sulfonylethanol, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In the ink compositions of the present invention, the liquid vehicle is typically present in an amount of from about 60 to about 95 percent by weight of the ink, and preferably from about 70 to about 90 percent by weight of the ink, although the amount can be outside these ranges.

In one specific embodiment, the liquid vehicle contains a penetrant material selected from betaine, cyclohexyl pyrrolidinone, butyl carbitol (diethylene glycol monobutyl ether), tripropylene glycol monomethyl ether, or mixtures thereof. The penetrant material is present in any effective or desired amount, typically from about 0.1 to about 20 percent by weight, and preferably from about 3 to about 15 percent by weight, although the amount can be outside these ranges. Inks of this specific embodiment are preferred over those containing a surfactant because of frequently reduced viscosity.

Also contained in the ink composition of the present invention is a colorant. Any suitable colorant can be employed, including dyes, pigments, mixtures thereof, and the like.

Suitable dye or mixture of dyes compatible with the ink liquid vehicle include acid dyes, direct dyes, reactive dyes, and the like, with water soluble anionic dyes being preferred. Examples of suitable dyes include Food dyes such as Food Black No. 1, Food Black No. 2, Food Red No.40, Food Blue No.1, Food Yellow No. 7, and the like, FD & C dyes, Acid Black dyes (No.1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No.1, 2,16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza[18]annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the PROJET FAST 2 Series of dyes, available from Zeneca Colours, Dighton, Mass., such as PROJET FAST CYAN 2, PROJET FAST YELLOW 2, PROJET FAST MAGENTA 2, PROJET FAST BLACK 2, and the like, the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any effective amount, typically from about 0.5 to about 15 percent by weight of the ink, and preferably from about 1 to about 10 percent by weight of the ink, although the amount can be outside of these ranges.

Examples of preferred dyes for the inks of the present invention include Reactive Red 180 dye (commercially available as, for example, DUASYN BRILLIANT RED F3B SF VP 218 from Hoechst, Coventry, R.I.), Acid Red 52 dye (commercially available from, for example Tricon Colors, Elmwood Park, N.J.), Acid Yellow 23 dye (commercially available as, for example, DUASYN ACID YELLOW XX-SF VP413 from Hoechst, Coventry, R.I.), Acid Yellow 17 dye (commercially available from, for example Tricon Colors, Elmwood Park, N.J.), Acid Blue 9 dye, Direct Blue 199 dye (commercially available as, for example, PROJET CYAN 1 from Zeneca Colors, Dighton, Mass.), Direct Yellow 132 dye (commercially available as, for example, PROJET YELLOW 1 G from Zeneca Colors, Dighton, Mass.), Reactive Red 180 dye (commercially available as, for example, PROJET MAGENTA 1T from Zeneca Colors, Dighton, Mass.), and mixtures thereof. In one embodiment, the ink contains a mixture of Reactive Red 180 dye and Acid Red 52 dye. In one particular embodiment containing this dye mixture, the ink further contains a mixture of betaine and butyl carbitol. In another particular embodiment containing this dye mixture, the ink further contains a mixture of tripropylene glycol monomethyl ether and a polymeric polyethylene oxide additive. In another embodiment, the ink contains a mixture of Acid Yellow 23 dye and Acid Yellow 17 dye. In one particular embodiment containing this dye mixture, the ink further contains a mixture of betaine and butyl carbitol. Inks of the present invention containing the fluorinated material and one or more of the above dye compositions exhibit excellent shelf stability as a result of the compatibility of these dyes with the fluorinated material. In addition, the inks exhibit good compatibility with printhead hardware, improved waterfastness and lightfastness, excellent optical density, and good color quality.

Examples of suitable pigments for the inks of the present invention include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamide) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-1 1 1-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2GO1 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991 K (BASF), Paliotol Yellow 1840 (BASF), Novoperm Yellow F6 1 (Hoechst), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871 K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Hoechst, including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Additional examples of suitable hydrophilic pigment particles include the colored silica particles prepared as disclosed in, for example, U.S. Pat. No. 4,877,451 and U.S. Pat. No. 5,378,574, the disclosures of each of which are totally incorporated herein by reference. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

Also contained in the ink is a material of the formula

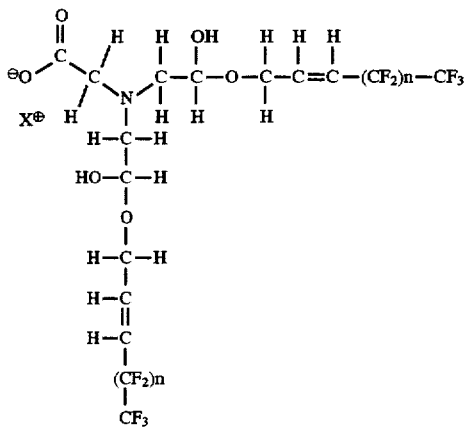

wherein X⁺ is a cation and n is an integer of from about 3 to about 20, preferably from about 4 to about 15, and more preferably from about 5 to about 11. Examples of suitable cations include $(HO-CH_2CH_2)_2NH_2^+$, tris(hydroxymethyl) aminomethane hydrochloride, tris(hydroxymethyl) aminomethane hydrocitrate, protonated 1,4-diazabicyclo (2.2.2)octane, and the like. Materials of this formula are available from, for example, Ciba-Geigy, Ardsley, New York (Greensboro, N.C.) as LODYNE P-502, containing a mixture of compounds wherein n has varying values and has an average value of about 9. The material of this formula is present in the ink in any effective or desired amount; typically, the amount ranges from about 0.1 to about 10 percent by weight of the ink, and preferably from about 2 to about 4 percent by weight of the ink, although the amount can be outside these ranges.

In one preferred embodiment of the present invention, the fluorinated material is of the formula

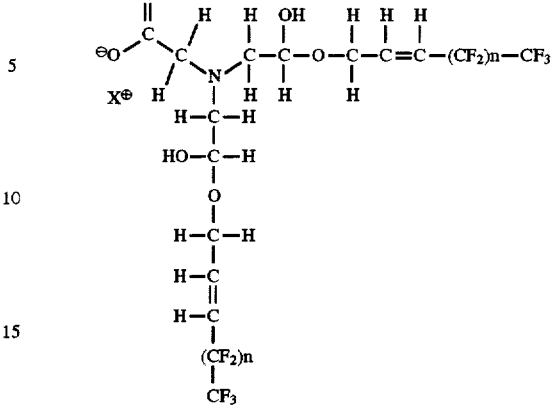

wherein n is 5. This material is available from, for example, Ciba-Geigy, Ardsley, New York (Greensboro, N.C.) as LODYNE P-502L, containing the fluorocarbon wherein substantially all of the material has exactly 6 carbon atoms in each of the fluorinated hydrocarbon chains. Inks containing this material exhibit improved shelf stability, even when the fluorocarbon and/or the ink are not subjected to ultrasonification or high shear mixing. These materials also exhibit good shelf stability with a wide variety of dyes, whereas inks containing mixtures of fluorocarbons of the above formula wherein n has varying values may be compatible with some dyes and may exhibit reduced shelf stability with other dyes. The ink fabrication process is accordingly simplified, with no need for procedures other than simple mixing of the ingredients to obtain optimal performance.

Ink compositions of the present invention also contain a polymer. Suitable polymers include tetrafunctional block copolymers derived from the sequential addition of propylene oxide and ethylene oxide to ethylenediamine, such as those of the general formula

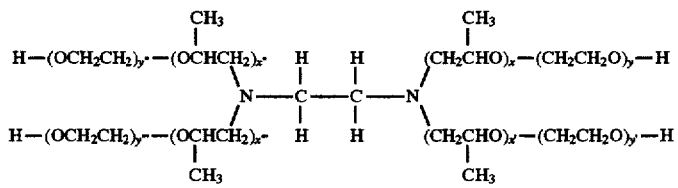

wherein x, x', x", x''', y, y', y", and y''' are each integers representing the number of repeating monomer units and have values such that the molecular weight range of the compound is from about 1,650 to about 27,000, the values of x, x', x", and x''' are each such that the polypropylene oxide segments of the compound have a total molecular weight of at least about 250 and preferably from about 500 to about 7,000, and the values of y, y', y", and y''' are each such that the polyethylene oxide segments constitute from about 5 to about 90 percent by weight of the total molecular weight of the compound, and preferably from about 10 to about 80 percent by weight of the total molecular weight of the compound, with typical values for x, x', x", and x'" being from 1 to about 127 and typical values for y, y', y", and y'" being from 1 to about 110, such as TETRONIC 904, wherein the values of x, x', x", x'", y, y', y", and y'" are each such that the total molecular weight of the polypropylene oxide blocks of the compound is from about 3,900 to about 4,500 and the ethylene oxide segments make up about 40 percent by weight of the compound (average number of propylene oxide groups per molecule from about 68 to about 76 (typically from about 17 to about 19 repeating units per chain, with four chains per molecule), total molecular weight from about 6,500 to about 7,500), TETRONIC 704, wherein the values of x, x', x", x'", y, y', y", and y'" are each such that the total molecular weight of the polypropylene oxide blocks of the compound is from about 2,500 to about 3,600 and the ethylene oxide segments make up about 40 percent by weight of the compound (average number of propylene oxide groups per molecule from about 43 to about 62 (typically from about 13 to about 15 repeating units per chain, with four chains per molecule), total molecular weight from about 4,150 to about 6,000), and TETRONIC 304, wherein the values of x, x', x", x'", y, y', y", and y'" are each such that the total molecular weight of the polypropylene oxide blocks of the compound is from about 500 to about 1,900 and the ethylene oxide segments make up about 40 percent by weight of the compound (average number of propylene oxide groups per molecule from about 8 to about 32 (typically from about 2 to about 8 repeating units per chain, with four chains per molecule), total molecular weight from about 800 to about 3,200), all commercially available from BASF, Parsippany, N.J. Also suitable are polyethylene oxide-polypropylene oxide-polyethylene oxide triblock copolymers, including those formed by the controlled addition of propylene oxide to the two hydroxyl groups of propylene glycol, followed by addition of ethylene oxide, such as those of the general formula

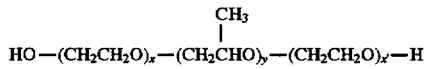

wherein x, x', and y are each integers representing the number of repeating monomer units and have values such that the molecular weight range of the compound is from about 1,000 to about 14,000, the value of y is such that the polypropylene oxide segment of the compound has a molecular weight of at least about 900 and preferably is from about 950 to about 4,000, and the values of x and x' are such that the polyethylene oxide segments constitute from about 5 to about 90 percent by weight of the total molecular weight of the compound, and preferably from about 10 to about 80 percent by weight of the total molecular weight of the compound, such as PLURONIC L35, wherein the values of x, x', and y are each such that the molecular weight of the polypropylene oxide block of the compound is from about 925 to about 1,050 and the ethylene oxide segments make up about 50 percent by weight of the compound (average number of propylene oxide groups per molecule from about 16 to about 18, total molecular weight from about 1,900 to about 2,000), PLURONIC L64, wherein the values of x, x', and y are each such that the molecular weight of the polypropylene oxide block of the compound is from about 1,625 to about 1,875 and the ethylene oxide segments make up about 40 percent by weight of the compound (average number of propylene oxide groups per molecule from about 28 to about 32, total molecular weight from about 2,700 to about 3,150); PLURONIC L62F, which is a mixture containing about 90 percent by weight of a compound wherein the values of x, x', and y are each such that the molecular weight of the polypropylene oxide block of the molecule is from about 1,625 to about 1,875 and the ethylene oxide segments make up about 20 percent by weight of the molecule (average number of propylene oxide groups per molecule from about 28 to about 32, total molecular weight from about 2,000 to about 2,350) and about 10 percent by weight of a compound wherein the values of x, x', and y are each such that the molecular weight of the polypropylene oxide block of the molecule is 1,625 to about 1,875 and the ethylene oxide segments make up about 10 percent by weight of the molecule (average number of propylene oxide groups per molecule from about 28 to about 32, total molecular weight from about 1,800 to about 2,100); and PLURONIC P65, wherein the values of x, x', and y are each such that the molecular weight of the polypropylene oxide block of the molecule is from about 1,625 to about 1,875 and the ethylene oxide segments make up about 50 percent by weight of the molecule (average number of propylene oxide groups per molecule from about 28 to about 32, total molecular weight from about 3,250 to about 3,750), all commercially available from BASF. Also suitable are polypropylene oxide-polyethylene oxide-polypropylene oxide triblock copolymers, including those formed by the addition of ethylene oxide to ethylene glycol, followed by addition of propylene oxide, such as those of the general formula

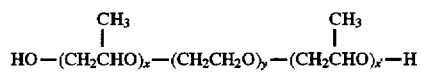

wherein x, x', and y are each integers representing the number of repeating monomer units and have values such that the molecular weight range of the compound is from about 1,000 to about 14,000, the value of x and x' are such that the polypropylene oxide segments of the compound have a molecular weight of at least about 900 and preferably from about 1000 to about 3,100, and the value of y is such that the polyethylene oxide segment constitutes from about 5 to about 90 percent by weight of the total molecular weight of the compound, and preferably from about 10 to about 80 percent by weight of the total molecular weight of the compound, such as PLURONIC 10R-5, wherein the values of x, x', and y are each such that the molecular weight of the polypropylene oxide blocks of the compound is about 1,000 and the ethylene oxide segments make up about 50 percent by weight of the compound, commercially available from BASF. Further information regarding the synthesis and structure of the TETRONICS and PLURONICS materials is disclosed in, for example, U.S. Pat. No. 4,062,907, U.S. Pat. No. 5,114,755, U.S. Pat. No. 5,001,165, U.S. Pat. No. 4,536,254, U.S. Pat. No. 4,670,058, U.S. Pat. No. 4,578,150, U.S. Pat. No. 5,078,781, U.S. Pat. No. 5,634,986, U.S. Pat. No. 5,653,970, U.S. Pat. No. 3,337,463, and U.S. Pat. No. 2,979,528, the disclosures of each of which are totally incorporated herein by reference. Also suitable are ethoxylated 2-naphthol polymers, preferably with a molecular weight of from about 20,000 to about 35,000 and more preferably from about 25,000 to about 30,000, such as SOLSPERSE 27,000, an ethoxylated 2-naphthol polymer with a molecular weight of 27,000, commercially available from ICI, Wilmington, Del. Mixtures of two or more polymers can also be employed. The polymer is present in the ink in any desired or effective amount, typically from about 0.01 to about 3 percent by weight of the ink, preferably from about 0.05 to about 2 percent by weight of the ink, and more preferably from about 0.05 to about 0.5 percent by weight of the ink, although the amount can be outside these ranges.

The ink compositions of the present invention also contain an additive selected from the group consisting of (i) diethylene glycol; (ii) glycerol; (iii) trimethylol propane; (iv) urea; (v) n-methyl pyrrolidone; (vi) sulfolane; (vii) 1,4diazabicyclo(2.2.2)octane; (viii) cyclohexylpyrrolidone; and (ix) mixtures thereof. This additive is present in the ink in any desired or effective amount, typically from about 1 to about 25 percent by weight of the ink, preferably from about 3 to about 20 percent by weight of the ink, and more preferably from about 4 to about 15 percent by weight of the ink, although the amount can be outside these ranges.

While not being limited to any particular theory, it is believed that the polymers in the inks of the present invention inhibit liposomes and emulsified particles formed by the fluorinated material from flocculating, thereby inhibiting coalescence and shelf destabilization. It is further believed that the stabilization mechanism entails an association of the hydrophilic polymer portion with the liposome exterior surface, while the hydrophobic polymer portion points away from the liposome to provide steric hindrance to the approach of another liposome, thus inhibiting flocculation. The particular additive or additives selected, such as diethylene glycol, glycerol, trimethylol propane, urea, n-methyl pyrrolidone, sulfolane, 1,4 diazabicyclo(2.2.2)octane, or cyclohexylpyrrolidone, further enable this stabilization mechanism. Specific additives tend to be preferred for specific polymers. For example, inks containing the TETRONIC 904 polymer preferably contain diethylene glycol, trimethylol propane, urea, or glycerol, and preferably do not contain N-methylpyrrolidinone or sulfolane. Inks containing the TETRONIC 704 polymer preferably contain diethylene glycol, trimethylol propane, N-methylpyrrolidinone, sulfolane, or glycerol, and preferably do not contain urea or 1,4 diazabicyclo(2.2.2)octane. Inks containing the PLURONIC 10R-5 polymer preferably contain diethylene glycol, n-methylpyrrolidone, urea, or glycerol, and preferably do not contain sulfolane or trimethylol propane. Inks containing the PLURONIC L35 polymer preferably contain diethylene glycol, trimethylol propane, N-methylpyrrolidone, urea, or glycerol, and preferably do not contain sulfolane or tripropylene glycol monomethyl ether. Inks containing the PLURONIC L64 polymer preferably contain diethylene glycol, trimethylol propane, N-methylpyrrolidone, urea, or glycerol, and preferably do not contain 1,4diazabicyclo(2.2.2)octane or tripropylene glycol monomethyl ether. Inks containing the PLURONIC L62F polymer preferably contain diethylene glycol, trimethylol propane, sulfolane, or urea, and preferably do not contain N-methylpyrrolidone or glycerol. Inks containing the TETRONIC 304 polymer preferably contain diethylene glycol, trimethylol propane, N-methylpyrrolidone, urea, or glycerol, and preferably do not contain 1,4diazabicyclo(2.2.2)octane or tripropylene glycol monomethyl ether. Inks containing the PLURONIC P65 polymer preferably contain diethylene glycol, N-methylpyrrolidone, sulfolane, or glycerol, and preferably do not contain urea or trimethylol propane. Inks containing the SOLSPERSE 27,000 polymer preferably contain 1,4diazabicyclo(2.2.2)octane or urea.

Optionally, betaine can also be present in the inks of the present invention. Betaine is commercially available from, for example, Finnsugar Biomedical, Helsinki, Finland. Betaine is present in the ink in any effective or desired amount; typically, the amount ranges from about 5 to about 25 percent by weight of the ink, and preferably from about 10 to about 20 percent by weight of the ink, although the amount can be outside these ranges. In a preferred embodiment of the present invention, betaine is present in the ink compositions in combination with dipropylene glycol. In this embodiment, the dipropylene glycol typically is present in the ink in an amount of up to about 20 percent by weight of the ink, preferably from about 5 to about 15 percent by weight of the ink, and more preferably from about 5 to about 10 percent by weight of the ink, although the amount can be outside these ranges. In another preferred embodiment of the present invention, betaine is present in the ink compositions in combination with butyl carbitol. In this embodiment, the butyl carbitol typically is present in the ink in an amount of up to about 15 percent by weight of the ink, preferably from about 2 to about 10 percent by weight of the ink, and more preferably from about 2 to about 5 percent by weight, although the amount can be outside these ranges.

Optionally, a monomeric compound having at least two carboxylic acid functional groups is also contained in the inks of the present invention. Examples of suitable multifunctional acids include ethylenediamine tetraacetic acid, aspartic acid, citric acid, malic acid, glutaric acid, adipic acid, oxalic acid, malonic acid, maleic acid, alpha keto glutaric acid, and the like. Additional examples of multifunctional acids include those disclosed in columns 19 to 22 of U.S. Pat. No. 5,589,277, the disclosure of which is totally incorporated herein by reference. The multifunctional acid is present in the ink in any effective or desired amount, typically from about 0.05 to about 5 percent by weight of the ink, preferably from about 0.2 to about 3 percent by weight of the ink, and more preferably from about 1 to about 2 percent by weight of the ink, although the amount can be outside these ranges. While not being limited to any particular theory, it is believed that the presence of the multifunctional acid in combination with the fluorocarbon material enhances the shelf stability of the inks of the present invention. The fluorocarbon material in an ink in the absence of a multifunctional acid may exhibit a tendency to salt out of the ink, particularly when the colorant is an anionic dye. It is believed that hydrogen bonding occurs between the polar carboxyl groups of the fluorocarbon material and the carboxyl groups of the multifunctional acid, thereby stabilizing the liposome structure of the fluorocarbon material in the ink. The stabilized ink also exhibits improved jetting characteristics and improved viscosity stability with respect to pH and temperature. It is believed that the stabilized liposome structure renders the liposomes resistant to coalescence, thereby improving resistance to viscosity build.

In a preferred embodiment, the ink compositions of the present invention contain no imidazole. Imidazole is employed in some embodiments of the present invention to enhance the shelf stability of inks containing the fluorinated material. Since imidazole can cause degradation of many materials commonly used to fabricate thermal ink jet printheads, inks of this embodiment of the present invention are advantageously benign with respect to ink jet printhead materials.

Another example of an optional additive to the inks is a polymeric additive consisting of two polyalkylene oxide chains bound to a central bisphenol-A-type moiety. This additive is of the formula

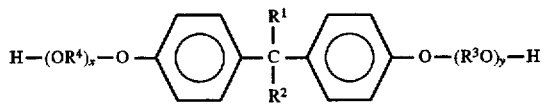

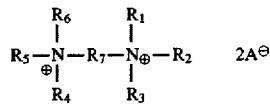

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Optionally, ink compositions of the present invention can also contain a bisquaternary ammonium compound. Bisquaternary ammonium compounds suitable for the present invention include (but are not limited to) those of the general formula wherein each of $R_1$, $R_2$, $R_3$, $R_4$, $R_5$, and $R_6$, independently of the others, is an alkyl group, preferably with from 1 to about 6 carbon atoms (and wherein the alkyl group can be substituted with, for example, hydroxide groups, halide groups, or the like, $R_7$ is an alkylene group, preferably with from about 2 to about 10 carbon atoms (and wherein the alkylene group can be substituted with, for example, hydroxide groups, halide groups, or the like), and wherein A is an anion. Examples of suitable anions include (but are not limited to) hydroxide, halide, citrate, ethylene diamine tetraacetate, phosphite, and the like. Examples of suitable bisquaternary ammonium compounds include N,N'-hexamethylenebis(tributyl ammonium) compounds, N,N'-hexamethylenebis(trimethyl ammonium) compounds, and the like. Specific examples of suitable bisquaternary ammonium compounds include N,N'-hexamethylenebis(tributyl ammonium hydroxide), of the formula

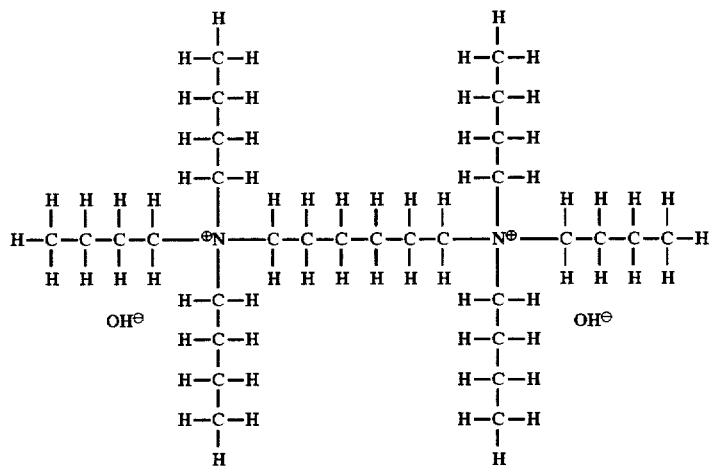

N,N'-hexamethylenebis(trimethyl ammonium bromide) (also called hexamethonium bromide), of the formula

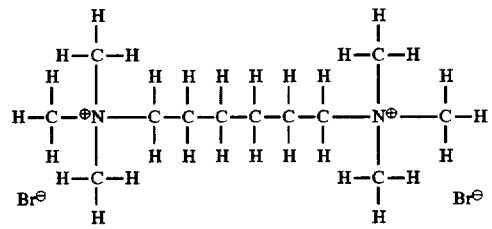

and the like. The bisquaternary ammonium compound is present in the ink in any desired or effective amount, typically in a stoichiometric amount of from about 0.1 to about 4 moles of bisquaternary ammonium compound per one mole of fluorinated material, preferably in a stoichiometric amount of from about 0.25 to about 2 moles of bisquaternary ammonium compound per one mole of fluorinated material, and more preferably in a stoichiometric amount of from about 0.5 to about 1 moles of bisquaternary ammonium compound per one mole of fluorinated material, although the relative amounts can be outside these ranges. The bisquaternary ammonium compound typically is present in the ink in an amount of from about 0.1 to about 10 percent by weight of the ink, and preferably from about 0.5 to about 4 percent by weight of the ink, although the amount can be outside these ranges.

While not being limited to any particular theory, it is believed that the bisquaternary ammonium compound becomes associated with the fluorinated material (which has a carboxylic acid substituent) and imparts shelf stability to the ink. It is further hypothesized that the bisquaternary ammonium compound associated with the fluorinated material may reduce liposome lattice energy through ionic complexation, thereby arresting liposome growth and inhibiting phase separation in the ink composition. Additionally, it is hypothesized that the bisquaternary ammonium compound associated with the fluorinated material may increase the liposome radius of curvature, thereby stabilizing small liposomes relative to large liposomes (which may undesirably increase ink viscosity).

Optionally, also contained in the ink is 1,4-diazabicyclo (2.2.2)octane, of the formula

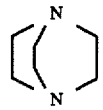

The 1,4-diazabicyclo(2.2.2)octane acts as a buffer in the ink composition, maintaining the ink containing the fluorinated material additive at a desirable pH in the event of acid contamination. In addition, the 1,4-diazabicyclo(2.2.2) octane is highly efficient as a buffer, with relatively small amounts being required in the ink to enable the buffering function. Typically, the 1,4-diazabicyclo(2.2.2)octane is present in an amount from about 0.1 to about 6 percent by weight of the ink, preferably from about 0.5 to about 4 percent by weight of the ink, and more preferably from about 1 to about 3 percent by weight of the ink, although the amount can be outside these ranges. Further, the presence of the 1,4-diazabicyclo(2.2.2)octane enables buffered ink compositions containing the fluorinated material without undesirable increase in viscosity, particularly when the ink is heated or subjected to changes in pH.

Other additives can also be present in the inks. For example, one or more surfactants or wetting agents can be added to the ink. These additives may be of the cationic, anionic, or nonionic types. Suitable surfactants and wetting agents include sodium lauryl sulfate, TAMOL® SN, TAMOL® LG, those of the TRITON® series available from Rohm and Haas Company, those of the MARASPERSE® series, those of the IGEPAL® series available from GAF Company, those of the TERGITOL® series, SURFYNOL® GA, available from Air Products and Chemicals Co., and other commercially available surfactants. These surfactants and wetting agents are present in effective amounts, generally from 0 to about 10 percent by weight, and preferably from about 0.01 to about 4 percent by weight, although the amount can be outside of this range.

In one specific embodiment the ink contains a nonionic surfactant. Any suitable or desired nonionic surfactant may be employed. Examples of suitable nonionic surfactants include octylphenoxy polyethoxy ethanols, such as TRITON X-100, available from Union Carbide Co., Danbury, Conn., acetylenic diols such as 2,4,7,9-tetramethyl-5-decyn-4,7-diol and the like, such as SURFYNOL GA and SURFYNOL CT-136, available from Air Products & Chemicals Co., Allentown, Pa. trimethyl nonylpolyethylene-glycol ethers, such as TERGITOL TMN-10 (containing 10 oxyethylene units, believed to be of the formula $C_{12}H_{25}O(C_2H_4O)_5H$), available from Union Carbide Co., Danbury, Conn., nonionic esters of ethylene oxide, such as MERPOL SH (believed to be of the formula $CH_3(CH_2)_{12}(OC_2H_4)_8OH$), available from E.I. Du Pont de Nemours & Co., Wilmington, Del., non-ionic esters of ethylene oxide and propylene oxide, such as MERPOL LFH (believed to be of the formula $CH_3(CH_2)_n(OC_2H_4)_8(OC_3H_6)_8OH$ where n is an integer from about 12 to about 16), available from E.I. Du Pont de Nemours & Co., Wilmington, Del., and the like, as well as mixtures thereof. The nonionic surfactant is present in the ink in any suitable or desired amount, typically from about 0.1 to about 5 percent by weight of the ink, and preferably from about 0.5 to about 2 percent by weight of the ink, although the amount can be outside of these ranges.

Polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethylene oxide, block copolymers of polyethylene oxide and polypropylene oxide, polyvinylpyridine, polyethyleneimine, polyhydroxyethyl ethyleneimine, polyquaternary salts, and the like are typical polymeric additives. Polymeric additives can be present in the ink of the present invention in amounts of from 0 to about 10 percent by weight, and preferably from about 0.01 to about 5 percent by weight, although the amount can be outside this range.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions are generally of a viscosity suitable for use in thermal ink jet printing processes. At room temperature (i.e., about 25° C.), typically, the ink viscosity is no more than about 5 centipoise, and preferably is from about 1 to about 3.5 centipoise, although the viscosity can be outside this range.

Ink compositions of the present invention can be of any suitable or desired pH. For some embodiments, such as thermal ink jet printing processes, typical pH values are from about 8 to about 9.5, preferably from about 8.0 to about 9.0, and more preferably from about 8.5 to about 9.0, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients and filtering.

In one specific embodiment, the ink is subjected to ultrasonification to reduce the particle size of the liposomes in the ink formed by the fluorocarbon material. In this embodiment, the ink is subjected to ultrasonication at relatively low intensity, typically for from about 5 to about 90 minutes, preferably from about 10 to about 60 minutes, and in a preferred embodiment for about 20 minutes. In another specific embodiment of the present invention, the fluorocarbon material is subjected to ultrasonification prior to admixing it with the other ink ingredients. In this second embodiment, the fluorocarbon can be ultrasonicated either in the form in which it is received from the supplier (assuming said form is a liquid containing the fluorocarbon) or after admixing it with water, mixtures of water and one or more other desired ink components, or the like. In a particularly preferred embodiment, the ultrasonicated liquid contains the fluorocarbon material in an amount of about 15 percent by weight and water in an amount of about 85 percent by weight. In another particularly preferred embodiment, the ultrasonicated liquid contains the fluorocarbon material in an amount of about 15 percent by weight, 1,4-diazabicyclo (2.2.2)octane in an amount of about 20 percent by weight, and water in an amount of about 65 percent by weight. In another particularly preferred embodiment, the ultrasonicated liquid contains the fluorocarbon material in an amount of from about 9 to about 10 percent by weight, 1,4-diazabicyclo(2.2.2)octane in an amount of from about 6 to about 7 percent by weight, a bisquaternary compound, such as hexamethonium bromide, in an amount of from about 4 to about 5 percent by weight, an acid, such as citric acid, in an amount of from about 2 to about 3 percent by weight, and the balance water.

One specific example of an ultrasonication process is as follows: LODYNE P-502, obtained from Tricon Colors as an aqueous solution containing about 15 percent by weight of the fluorocarbon, is divided into 25 gram portions. In each instance, a 25 gram portion of the LODYNE P-502 is placed in a 30 gram vial. The vial is placed into a 550 SONIC DISMEMBRATOR (obtained from Fisher Scientific Co.) tuned at 20 kiloHertz and the LODYNE P-502 is subjected to ultrasonification for a period of 10 minutes at an amplitude setting of 5, with the power turned on and off every 30 seconds. Thereafter the vial is allowed to stand overnight, after which the top layer in the vial is used to prepare ink compositions.

To avoid excessive heating of the ink during the ultrasonification process, the ink can be jacket cooled during the process, and/or the ultrasonification can be pulsed instead of continuous; for example, for a process entailing application of ultrasonification for 5 minutes, the process can be pulsed at one second on and one second off alternately for a period of 10 minutes. Reduction in liposome size by ultrasonification enables advantages such as enhanced shelf life of the ink and reduced ink viscosity. Ultrasonification also results in a narrower range of liposome particle diameters.

In yet another specific embodiment, neither the fluorocarbon nor the ink is subjected to ultrasonification during the formulation process. Inks suitable for ink jet printing exhibiting a liquid crystalline phase at certain temperatures are known, as disclosed in, for example, U.S. Pat. No. 5,492,559, U.S. Pat. No. 5,551,973, and U.S. Pat. No. 5,643,357, the disclosures of each of which are totally incorporated herein by reference. Fluorocarbon materials such as LODYNE P-502, available from Ciba-Geigy, when received from the manufacturer, contain liquid crystals as observed by microscopic inspection under polarized illumination. Inks containing the fluorocarbon and other ink vehicle ingredients, such as betaine/dipropylene glycol and betaine/imidazole, retain the fluorocarbon liquid crystal structures. When two or more of these inks of different colors are incorporated into a thermal ink jet printer, such as a Hewlett-Packard DeskJet® 500C, and printed onto a substrate such as plain paper, the resulting multicolored images exhibit improved intercolor bleed repression characteristics compared to inks of identical composition but wherein the fluorocarbon was ultrasonified prior to incorporation into the ink composition and inks of identical composition which were subjected to ultrasonification subsequent to ink preparation.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared by admixing the following ingredients:

| Ingredient | Supplier | Amount (grams) |
|---|---|---|
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| urea | Aldrich Chemicol Co. | 10 |
| polyethylene oxide** | Polysciences | 0.05 |
| DOWICIL 150/200 | Dow Chemical Co. | 0.1 |
| TETRONIC 904 | BASF | 0.1 |
| LODYNE P-502* | Ciba-Geigy roll mill 30 minutes | 16.67 |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

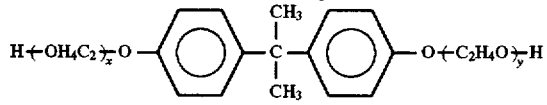

The resulting ink was then filtered through a 1.2 micron Memtec PPD 0.45-142-10 filter at 3 pounds per square inch. The ink composition thus prepared exhibited a viscosity of 2.32 centipoise at 25° C., a pH of 8.96 at 23° C., a surface tension of 25.8 dynes per centimeter, and a conductivity of 5.91 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE II

An ink composition was prepared by admixing the following ingredients:

| Ingredient | Supplier | Amount (grams) |
| --- | --- | --- |
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| glycerol | Chemcentral | 10 |
| polyethylene oxide** | Polysciences | 0.05 |
| DOWICIL 150/200 | Dow Chemical Co. | 0.1 |
| TETRONIC 904 | BASF | 0.1 |
| LODYNE P-502* | Ciba-Geigy roll mill 30 minutes | 16.67 |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

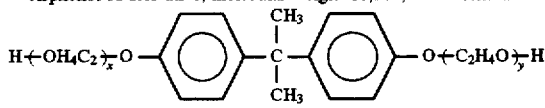

The resulting ink was then filtered through a 1.2 micron Memtec PPD 0.45-142-10 filter at 3 pounds per square inch. The ink composition thus prepared exhibited a viscosity of 2.82 centipoise at 25° C., a pH of 8.65 at 24° C., a surface tension of 27.6 dynes per centimeter, and a conductivity of 6.09 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE III

An ink composition was prepared by admixing the following ingredients:

| Ingredient | Supplier | Amount (grams) |
| --- | --- | --- |
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| glycerol | Chemcentral | 10 |
| polyethylene oxide** | Polysciences | 0.05 |
| DOWICIL 150/200 | Dow Chemical Co. | 0.1 |
| TETRONIC 704 | BASF | 0.1 |
| LODYNE P-502* | Ciba-Geigy roll mill 30 minutes | 16.67 |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

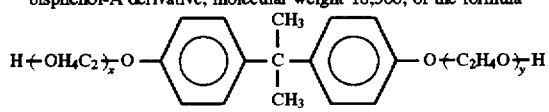

The resulting ink was then filtered through a 1.2 micron Memtec PPD 0.45-142-10 filter at 3 pounds per square inch. The ink composition thus prepared exhibited a viscosity of 2.67 centipoise at 25° C., a pH of 8.63 at 24° C., a surface tension of 25.8 dynes per centimeter, and a conductivity of 6.31 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE IV

An ink composition was prepared by admixing the following ingredients:

| Ingredient | Supplier | Amount (grams) |
| --- | --- | --- |
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| urea | Aldrich Chemical Co. | 10 |
| polyethylene oxide** | Polysciences | 0.05 |
| DOWICIL 150/200 | Dow Chemical Co. | 0.1 |
| PLURONIC 10R-5 | BASF | 0.1 |
| LODYNE P-502* | Ciba-Geigy roll mill 30 minutes | 16.67 |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

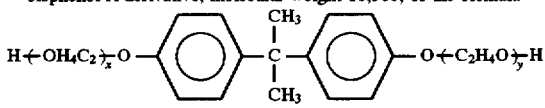

The resulting ink was then filtered through a 1.2 micron Memtec PPD 0.45-142-10 filter at 3 pounds per square inch. The ink composition thus prepared exhibited a viscosity of 2.43 centipoise at 25° C., a pH of 8.98 at 23° C., a surface tension of 26.8 dynes per centimeter, and a conductivity of 6.36 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE V

An ink composition was prepared by admixing the following ingredients:

| Ingredient | Supplier | Amount (grams) |
| --- | --- | --- |
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| glycerol | Chemcentral | 10 |
| polyethylene oxide** | Polysciences | 0.05 |
| DOWICIL 150/200 | Dow Chemical Co. | 0.1 |
| PLUPONIC 10R-5 | BASF | 0.1 |
| LODYNE P-502* | Ciba-Geigy roll mill 30 minutes | 16.67 |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

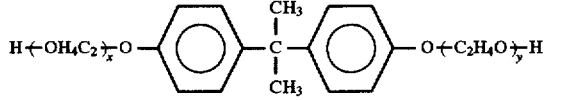

The resulting ink was then filtered through a 1.2 micron Memtec PPD 0.45-142-10 filter at 3 pounds per square inch. The ink composition thus prepared exhibited a viscosity of 2.60 centipoise at 25° C., a pH of 8.94 at 23° C., a surface tension of 24.6 dynes per centimeter, and a conductivity of 5.49 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE VI

An ink composition was prepared by admixing the following ingredients:

| Ingredient | Supplier | Amount (grams) |
| --- | --- | --- |
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| urea | Aldrich Chemical Co. | 10 |
| polyethylene oxide** | Polysciences | 0.05 |
| DOWICIL 150/200 | Dow Chemical Co. | 0.1 |
| PLUPONIC L35 | BASF | 0.1 |
| LODYNE P-502* | Ciba-Geigy | 16.67 |
| | roll mill 30 minutes | |

*supplied as a solution containing 18 percent by weight fluorocarbon; sonified prior to use for 1 hour with stirring; seting = 5; allowed to heat to 40° C.
**bisphenol-A derivative, molecular weight 18,500, of the formula

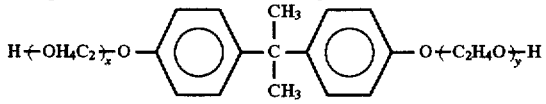

The resulting ink was then filtered through a 1.2 micron Memtec PPD 0.45-142-10 filter at 3 pounds per square inch. The ink composition thus prepared exhibited a viscosity of 2.08 centipoise at 25° C., a pH of 8.97 at 23° C., a surface tension of 26.3 dynes per centimeter, and a conductivity of 5.28 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE VII

An ink composition was prepared by admixing the following ingredients:

| Ingredient | Supplier | Amount (grams) |
| --- | --- | --- |
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| glycerol | Chemcentral | 10 |
| polyethylene oxide** | Polysciences | 0.05 |
| DOWICIL 150/200 | Dow Chemical Co. | 0.1 |
| PLURONIC L35 | BASF | 0.1 |
| LODYNE P-502* | Ciba-Geigy | 16.67 |
| | roll mill 30 minutes | |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

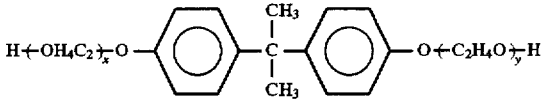

The resulting ink was then filtered through a 1.2 micron Memtec PPD 0.45-142-10 filter at 3 pounds per square inch. The ink composition thus prepared exhibited a viscosity of 2.65 centipoise at 25° C., a pH of 8.45 at 24° C., a surface tension of 24.9 dynes per centimeter, and a conductivity of 6.05 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE VIII

An ink composition was prepared by admixing the following ingredients:

| Ingredient | Supplier | Amount (grams) |
| --- | --- | --- |
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| urea | Aldrich Chemical Co. | 10 |
| polyethylene oxide** | Polysciences | 0.05 |
| DOWICIL 150/200 | Dow Chemical Co. | 0.1 |
| PLURONIC L64 | BASF | 0.1 |
| LODYNE P-502* | Ciba-Geigy | 16.67 |
| | roll mill 30 minutes | |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

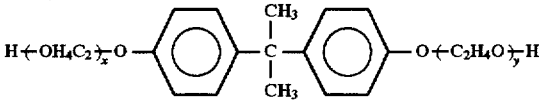

The resulting ink was then filtered through a 1.2 micron Memtec PPD 0.45-142-10 filter at 3 pounds per square inch. The ink composition thus prepared exhibited a viscosity of 3.67 centipoise at 25° C., a pH of 8.98 at 23° C., a surface tension of 25.9 dynes per centimeter, and a conductivity of 6.65 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE IX

An ink composition was prepared by admixing the following ingredients:

| Ingredient | Supplier | Amount (grams) |
| --- | --- | --- |
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| glycerol | Chemcentral | 10 |
| polyethylene oxide** | Polysciences | 0.05 |
| DOWICIL 150/200 | Dow Chemical Co. | 0.1 |
| PLURONIC L64 | BASF | 0.1 |
| LODYNE P-502* | Ciba-Geigy | 16.67 |
| | roll mill 30 minutes | |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

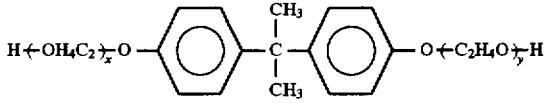

The resulting ink was then filtered through a 1.2 micron Memtec PPD 0.45-142-10 filter at 3 pounds per square inch. The ink composition thus prepared exhibited a viscosity of 2.63 centipoise at 25° C., a pH of 8.61 at 24° C., a surface tension of 24.8 dynes per centimeter, and a conductivity of 6.05 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE X

An ink composition was prepared by admixing the following ingredients:

| Ingredient | Supplier | Amount (grams) |
| --- | --- | --- |
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| urea | Aldrich Chemical Co. | 10 |
| polyethylene oxide** | Polysciences | 0.05 |
| DOWICIL 150/200 | Dow Chemical Co. | 0.1 |
| PLURONIC L62F | BASF | 0.1 |
| LODYNE P-502* | Ciba-Geigy | 16.67 |
| | roll mill 30 minutes | |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

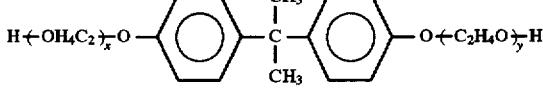

The resulting ink was then filtered through a 1.2 micron Memtec PPD 0.45-142-10 filter at 3 pounds per square inch. The ink composition thus prepared exhibited a viscosity of 2.14 centipoise at 25° C., a pH of 8.98 at 23° C., a surface tension of 26.0 dynes per centimeter, and a conductivity of 5.82 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE XI

An ink composition was prepared by admixing the following ingredients:

| Ingredient | Supplier | Amount (grams) |
| --- | --- | --- |
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| urea | Aldrich Chemical Co. | 10 |
| polyethylene oxide** | Polysciences | 0.05 |
| DOWICIL 150/200 | Dow Chemical Co. | 0.1 |
| TETRONIC 304 | BASF | 0.1 |
| LODYNE P-502* | Ciba-Geigy | 16.67 |
| | roll mill 30 minutes | |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

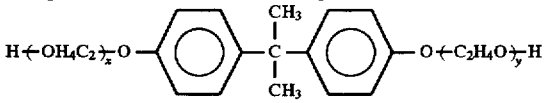

The resulting ink was then filtered through a 1.2 micron Memtec PPD 0.45-142-10 filter at 3 pounds per square inch. The ink composition thus prepared exhibited a viscosity of 2.46 centipoise at 25° C., a pH of 8.97 at 20° C., a surface tension of 25.4 dynes per centimeter, and a conductivity of 6.13 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE XII

An ink composition was prepared by admixing the following ingredients:

| Ingredient | Supplier | Amount (grams) |
| --- | --- | --- |
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| glycerol | Chemcentral | 10 |
| polyethylene oxide** | Polysciences | 0.05 |
| DOWICIL 150/200 | Dow Chemical Co. | 0.1 |
| TETRONIC 304 | BASF | 0.1 |
| LODYNE P-502* | Ciba-Geigy | 16.67 |
| | roll mill 30 minutes | |

| Ingredient | Supplier | Amount (grams) |
|---|---|---|

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

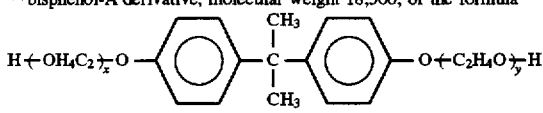

The resulting ink was then filtered through a 1.2 micron Memtec PPD 0.45-142-10 filter at 3 pounds per square inch. The ink composition thus prepared exhibited a viscosity of 2.69 centipoise at 25° C., a pH of 8.67 at 24° C., a surface tension of 25.3 dynes per centimeter, and a conductivity of 6.12 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE XIII

An ink composition was prepared by admixing the following ingredients:

| Ingredient | Supplier | Amount (grams) |
|---|---|---|
| deionized water | — | 58 |
| Acid Yellow 23 dye | Hoechst | 3 |
| betaine | FinnSugar Bioproducts | 8 |
| cyclohexyl pyrrolidone | Aldrich Chemical Co. | 4 |
| glycerol | Chemcentral | 10 |
| polyethylene oxide** | Polysciences | 0.05 |
| DOWICIL 150/200 | Dow Chemical Co. | 0.1 |
| PLURONIC P65 | BASF | 0.1 |
| LODYNE P-502* | Ciba-Geigy | 16.67 |
| | roll mill 30 minutes | |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

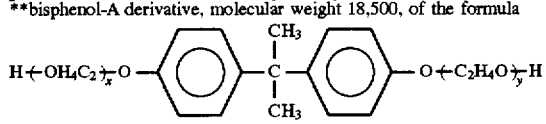

The resulting ink was then filtered through a 1.2 micron Memtec PPD 0.45-142-10 filter at 3 pounds per square inch. The ink composition thus prepared exhibited a viscosity of 2.56 centipoise at 25° C., a pH of 8.47 at 23° C., a surface tension of 26.5 dynes per centimeter, and a conductivity of 5.95 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE XIV

An ink composition was prepared by admixing the following ingredients:

| Ingredient | Supplier | Amount (grams) |
|---|---|---|
| deionized water | — | 190.78 |
| PROJET FAST YELLOW 2 dye (solid; H$_2$O stripped) | Zeneca Colors | 7.5 |
| betaine | FinnSugar Bioproducts | 24 |
| cyclohexyl pyrrolidone | Aldrich Chemical Co. | 12 |
| 1,4 diazabicyclo (2.2.2) octane | Aldrich Chemical Co. | 15 |
| polyethylene oxide** | Polysciences | 0.15 |
| DOWICIL 150/200 | Dow Chemical Co. | 0.3 |
| SOLSPERSE 27,000 | ICI | 0.3 |
| LODYNE P-502* | Ciba-Geigy | 49.99 |
| | roll mill 30 minutes; pH = 10.2 | |
| phosphorous acid | Rhone Poulenc pH = 9.02 | 4.375 |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula The resulting ink was then filtered through a 1.2 micron Memtec PPD 0.45-142-10 filter at 3 pounds per square inch. The ink composition thus prepared exhibited a viscosity of 2.54 centipoise at 25° C., a pH of 9.02 at 24° C., a surface tension of 26.7 dynes per centimeter, and a conductivity of 8.83 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE XV

An ink composition was prepared by admixing the following ingredients:

| Ingredient | Supplier | Amount (grams) |
|---|---|---|
| deionized water | — | 160.77 |
| PROJET FAST YELLOW 2 dye (solid; H$_2$O stripped) | Zeneca Colors | 7.5 |
| betaine | FinnSugar Bioproducts | 24 |
| cyclohexyl pyrrolidone | Aldrich Chemical Co. | 12 |
| 1,4 diazabicyclo (2.2.2) octane | Aldrich Chemical Co. | 45 |
| polyethylene oxide** | Polysciences | 0.15 |
| DOWICIL 150/200 | Dow Chemical Co. | 0.3 |
| SOLSPERSE 27,000 | ICI | 0.3 |
| LODYNE P-502* | Ciba-Geigy | 49.99 |
| | roll mill 30 minutes; pH = 10.5 | |
| phosphorous acid | Rhone Poulenc pH = 9.02 | 14.58 |

-continued

| Ingredient | Supplier | Amount (grams) |
|---|---|---|

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

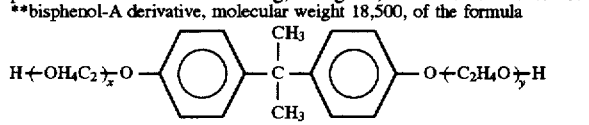

The resulting ink was then filtered through a 1.2 micron Memtec PPD 0.45-142-10 filter at 3 pounds per square inch. The ink composition thus prepared exhibited a viscosity of 4.64 centipoise at 25° C., a pH of 9.02 at 23° C., a surface tension of 27.1 dynes per centimeter, and a conductivity of 10.4 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

EXAMPLE XVI

An ink composition was prepared by admixing the following ingredients:

| Ingredient | Supplier | Amount (grams) |
|---|---|---|
| deionized water | — | 196.8 |
| PROJET FAST YELLOW 2 dye (solid; H$_2$O stripped) | Zeneca Colors | 7.5 |
| betaine | FinnSugar Bioproducts | 24 |
| cyclohexyl pyrrolidone | Aldrich Chemicol Co. | 6 |
| urea | Aldrich Chemical Co. | 15 |
| polyethylene oxide** | Polysciences | 0.15 |
| DOWICIL 150/200 | Dow Chemical Co. | 0.3 |
| SOLSPERSE 27,000 | ICI | 0.3 |
| LODYNE P-502* | Ciba-Geigy roll mill 30 minutes | 49.99 |

*supplied as a solution containing 18 percent by weight fluorocarbon; sonified prior to use for 1 hour with stirring; setting = 5; allowed to heat to 40° C.
**bisphenol-A derivative, molecular weight 18,500, of the formula

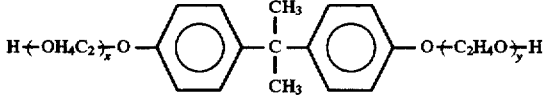

The resulting ink was then filtered through a 1.2 micron Memtec PPD 0.45-142-10 filter at 3 pounds per square inch. The ink composition thus prepared exhibited a viscosity of 2.44 centipoise at 25° C., a pH of 8.33 at 23° C., a surface tension of 24.4 dynes per centimeter, and a conductivity of 8.36 millimhos.

The ink composition thus prepared was then incorporated into a Hewlett-Packard 1600C thermal ink jet printer and printed onto Xerox® 4024 DP paper and Xerox® Image Series Elite paper. The prints thus formed exhibited low intercolor bleed with a MFLEN value of 5.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises (1) water, (2) a colorant, (3) a material of the formula $[(F_3C(F_2C)_n CH=CHCH_2OCH(OH)CH_2)_2NCH_2COO^-][X^+]$, wherein X is a cation and n is an integer of from about 3 to about 20, (4) a polymer selected from the group consisting of (a) tetrafunctional block copolymers derived from the addition of propylene oxide and ethylene oxide to ethylenediamine; (b) polyethylene oxide-polypropylene oxide-polyethylene oxide triblock copolymers; (c) polypropylene oxide-polyethylene oxide-polypropylene oxide triblock copolymers; (d) ethoxylated 2-naphthol polymers; and (e) mixtures thereof; and (5) an additive selected from the group consisting of (i) diethylene glycol; (ii) glycerol; (iii) trimethylol propane; (iv) urea; (v) n-methyl pyrrolidone; (vi) sulfolane; (vii) 1,4diazabicyclo(2.2.2)octane; (viii) cyclohexylpyrrolidone; and (ix) mixtures thereof.

2. An ink composition according to claim 1 wherein the colorant is an anionic dye.

3. An ink composition according to claim 1 wherein the colorant is a pigment.

4. An ink composition according to claim 1 wherein the material of the formula $[(F_3C(F_2C)_n CH=CHCH_2OCH(OH)CH_2)_2NCH_2COO^-][X^+]$ is present in an amount of from about 0.1 to about 10 percent by weight of the ink.

5. An ink composition according to claim 1 wherein the ink is substantially free of imidazole.

6. An ink composition according to claim 1 wherein X is selected from the group consisting of (HO—CH$_2$CH$_2$)$_2$NH$_2$+, tris(hydroxymethyl)aminomethane hydrochloride, tris(hydroxymethyl)aminomethane hydrocitrate, protonated 1,4-diazabicyclo(2.2.2)octane, and mixtures thereof.

7. An ink composition according to claim 1 wherein the ink also contains betaine.

8. An ink composition according to claim 1 wherein the ink also contains polyethylene oxide.

9. An ink composition according to claim 1 wherein the polymer is present in an amount of from about 0.01 to about 3 percent by weight of the ink.

10. An ink composition according to claim 1 wherein the additive is present in an amount of from about 1 to about 25 percent by weight of the ink.

11. An ink composition according to claim 1 wherein the ink contains (A) a tetrafunctional block copolymer derived from the sequential addition of propylene oxide and ethylene oxide to ethylenediamine wherein the total molecular weight of the polypropylene oxide blocks of the compound is from about 3,900 to about 4,500 and the ethylene oxide segments make up about 40 percent by weight of the compound, (B) cyclohexylpyrrolidone, and (C) an additive selected from the group consisting of diethylene glycol, trimethylol propane, urea, glycerol, and mixtures thereof.

12. An ink composition according to claim 1 wherein the ink contains (A) a tetrafunctional block copolymer derived from the sequential addition of propylene oxide and ethylene oxide to ethylenediamine wherein the total molecular weight of the polypropylene oxide blocks of the compound is from about 2,500 to about 3,600 and the ethylene oxide segments make up about 40 percent by weight of the compound, (B) cyclohexylpyrrolidone, and (C) an additive selected from the group consisting of diethylene glycol, trimethylol propane, N-methylpyrrolidinone, sulfolane, glycerol, and mixtures thereof.

13. An ink composition according to claim 1 wherein the ink contains (A) a tetrafunctional block copolymer derived from the sequential addition of propylene oxide and ethylene oxide to ethylenediamine wherein the total molecular weight of the polypropylene oxide blocks of the compound is from about 500 to about 1,900 and the ethylene oxide segments make up about 40 percent by weight of the compound, (B) cyclohexylpyrrolidone, and an additive selected from the group consisting of diethylene glycol, trimethylol propane, N-methylpyrrolidone, urea, glycerol, and mixtures thereof.

14. An ink composition according to claim 1 wherein the ink contains (A) a polypropylene oxide-polyethylene oxide-polypropylene oxide triblock copolymer wherein the molecular weight of the polypropylene oxide blocks of the compound is about 1,000 and the ethylene oxide segments make up about 50 percent by weight of the compound, (B) cyclohexylpyrrolidone, and (C) an additive selected from the group consisting of diethylene glycol, n-methylpyrrolidone, urea, glycerol, and mixtures thereof.

15. An ink composition according to claim 1 wherein the ink contains (A) a polyethylene oxide-polypropylene oxide-polyethylene oxide triblock copolymer wherein the molecular weight of the polypropylene oxide block of the compound is from about 925 to about 1,050 and the ethylene oxide segments make up about 50 percent by weight of the compound, (B) cyclohexylpyrrolidone, and (C) an additive selected from the group consisting of diethylene glycol, trimethylol propane, N-methylpyrrolidone, urea, glycerol, and mixtures thereof.

16. An ink composition according to claim 1 wherein the ink contains (A) a polyethylene oxide-polypropylene oxide-polyethylene oxide triblock copolymer wherein the molecular weight of the polypropylene oxide block of the compound is from about 1,625 to about 1,875 and the ethylene oxide segments make up about 40 percent by weight of the compound, (B) cyclohexylpyrrolidone, and (C) an additive selected from the group consisting of diethylene glycol, trimethylol propane, N-methylpyrrolidone, urea, glycerol, and mixtures thereof.

17. An ink composition according to claim 1 wherein the ink contains (A) a polyethylene oxide-polypropylene oxide-polyethylene oxide triblock copolymer wherein the molecular weight of the polypropylene oxide block of the compound is from about 1,625 to about 1,875 and the ethylene oxide segments make up from about 10 to about 20 percent by weight of the compound, (B) cyclohexylpyrrolidone, and (C) an additive selected from the group consisting of diethylene glycol, trimethylol propane, sulfolane, urea, and mixtures thereof.

18. An ink composition according to claim 1 wherein the ink contains (A) a polyethylene oxide-polypropylene oxide-polyethylene oxide triblock copolymer wherein the molecular weight of the polypropylene oxide block of the compound is from about 1,625 to about 1,875 and the ethylene oxide segments make up about 50 percent by weight of the compound, (B) cyclohexylpyrrolidone, and (C) an additive selected from the group consisting of diethylene glycol, N-methylpyrrolidone, sulfolane, glycerol, and mixtures thereof.

19. An ink composition according to claim 1 wherein the ink contains (A) an ethoxylated 2-naphthol polymer with a molecular weight of from about 25,000 to about 30,000, (B) cyclohexylpyrrolidone, and (C) an additive selected from the group consisting of 1,4 diazabicyclo(2.2.2)octane, urea, and mixtures thereof.

20. A process which comprises (i) incorporating into an ink jet printing apparatus an ink composition according to claim 1; and (ii) causing droplets of the ink composition to be ejected in an imagewise pattern onto a substrate.

21. A process according to claim 20 wherein the printing apparatus employs a thermal ink jet process wherein the ink in the nozzles is selectively heated in an imagewise pattern, thereby causing droplets of the ink to be ejected in imagewise pattern.

* * * * *